(No Model.)
J. W. ROCKAFELLOW.
SULKY CULTIVATOR.
No. 257,074. Patented Apr. 25, 1882.
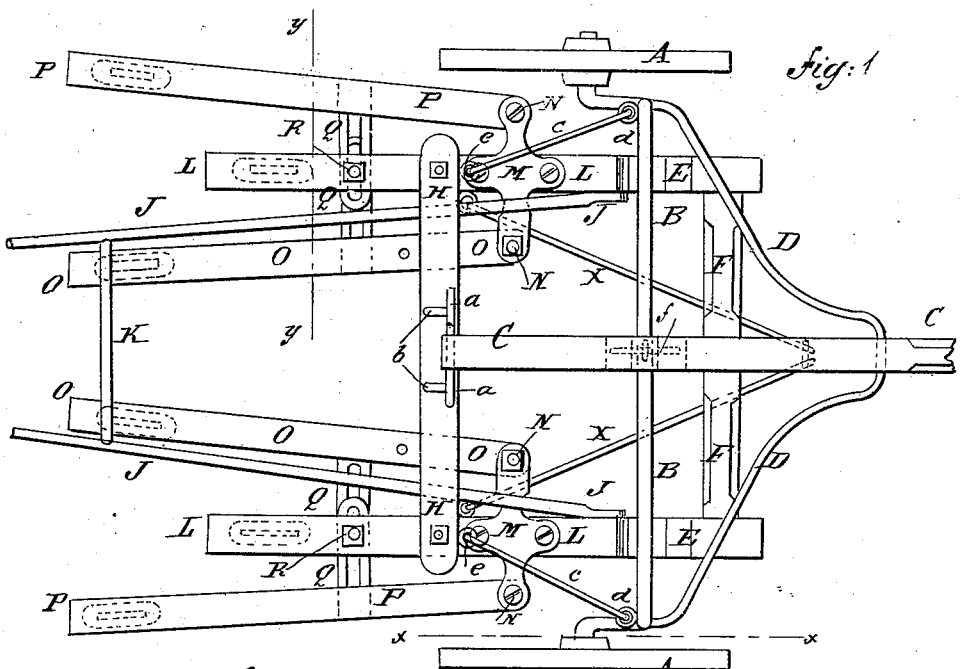
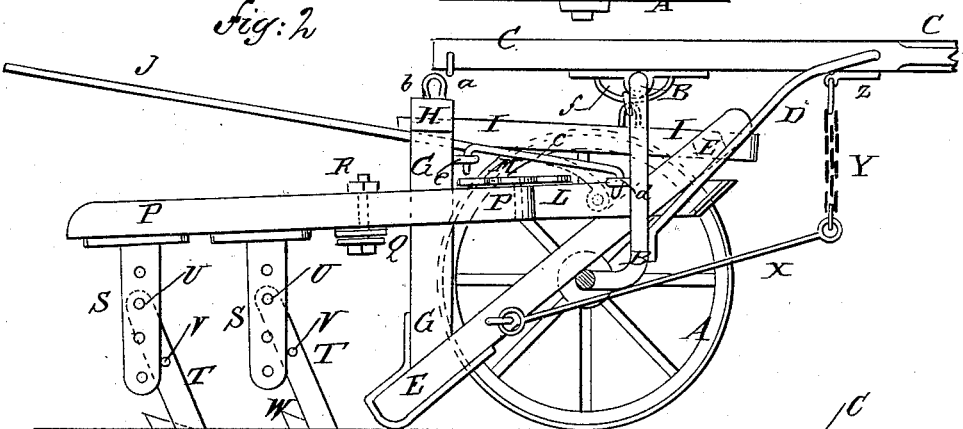
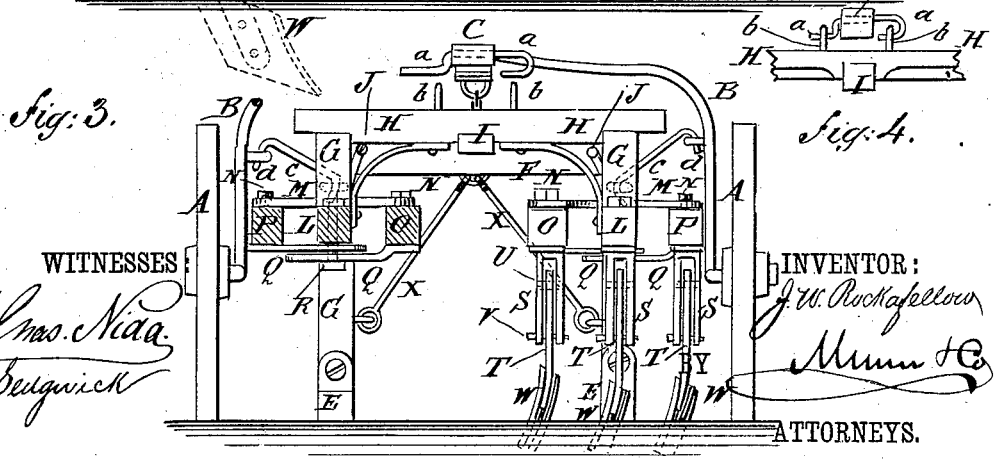
WITNESSES
Chas. Nida
C. Sedgwick
INVENTOR:
J. W. Rockafellow
Munn & Co.
ATTORNEYS.

UNITED STATES PATENT OFFICE.

JOHN W. ROCKAFELLOW, OF STOCKTON, NEW JERSEY.

SULKY-CULTIVATOR.

SPECIFICATION forming part of Letters Patent No. 257,074, dated April 25, 1882.

Application filed December 22, 1881. (No model.)

*To all whom it may concern:*

Be it known that I, JOHN WESLEY ROCKAFELLOW, of Stockton, in the county of Hunterdon and State of New Jersey, have invented a new and useful Improvement in Sulky-Cultivators, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same, partly in section through the line $x\,x$, Fig. 1. Fig. 3 is a rear elevation of the same, partly in section through the line $y\,y$, Fig. 1. Fig. 4 is a rear elevation of the mechanism for suspending the plows above the ground.

The object of this invention is to facilitate the adjustment of cultivators for various kinds of work and promote convenience in controlling the cultivators.

A represents the wheels, the axle B of which is bent into U form, and is attached at the center of its middle or horizontal part to the tongue C. The arms of the bent axle B are bent to the rearward and then outward to bring the wheels A into proper position for the cultivator to be balanced upon them when the plows are raised from the ground.

The connection between the tongue C and the axle B is strengthened by the braces D, attached to the said tongue and to the arms of the said axle, as shown in Figs. 1 and 2.

E are two inclined bars, the rear ends of which slide upon the ground, and are designed to serve as gages to cause the plows to work at a uniform depth in the ground. The lower ends of the bars E are faced with metal to prevent wear. The forward ends of the bars E are connected by a cross-bar, F.

To the inclined bars E, at a little distance from their rear ends, are attached the lower ends of the upright bars G, the upper ends of which are connected by a cross-bar, H. The frame thus formed is stiffened and strengthened by a longitudinal bar, I, the ends of which are attached to the centers of the cross-bars F H.

J are the handles by means of which the cultivator is guided and controlled, and the forward ends of which are attached to the inner sides of the forward parts of the inclined gage-bars E. The handles J pass back through the angles between the uprights G and the cross-bar H, and project into such a position that they can be readily reached by the plowman. The rear parts of the handles J are connected by a round, K.

To the forward parts of the inclined gage-bars E and to the uprights G are rigidly attached the forward parts of the plow-beams L, to which, just in front of the uprights G, are attached cross-head bars or plates M. The ends of the bars or plates M project upon the opposite sides of the said beams L, and to them are hinged by the bolts N the forward ends of the inner beams, O, and the outer beams, P, so that the rear ends of the said beams O P can have a lateral movement to adjust the plows at any desired distance apart.

To the lower sides of the beams O P are attached the ends of the bars Q, which overlap each other beneath the plow-beams L, and are slotted longitudinally to receive the bolts R, attached to the said beams L, so that by loosening the said bolts R the beams O P can be adjusted nearer to or farther from the said beams L, as the work to be done may require.

To the lower side of the rear end of each of the beams L O P is secured the upper end of a hanger, S, which is slotted longitudinally to receive the upper end of the standard T. The upper ends of the standards T are hinged to the hangers S by bolts U, and several holes are formed in the said hangers to receive the said bolts, so that the plows can be adjusted to work deeper or shallower in the soil by adjusting the said bolts.

The draft-strain upon the standards T is sustained by wooden pins V, which are made of such a strength as to sustain the strain under ordinary circumstances, but which, should the plows strike an obstruction, will break and allow the said plows to swing back so as to prevent the plows from being broken.

To the lower ends of the standards T are attached the plows W, which may be diamond-shaped, as shown in Fig. 2, or of any other desired shape, as the character of the work to be done may require.

When cultivating plants the plows can be adjusted to throw the soil toward or from the plants, as may be desired. For general cultivation, the plows can be adjusted to throw the soil in the same direction. In the latter case the plow-beams should be adjusted to bring the plows to the same distance apart laterally, and the inner beams, O, (one or both,) can be moved forward, a second set of holes being formed in the said beams O to receive the bolts N when this adjustment is to be made.

To the lower parts of the inclined bars E are hinged the rear ends of the draft-rods X, to the forward ends of which is attached the lower end of a short chain, Y.

If desired, the draft-rods X can be made in one piece, in the form of an angular bail.

The upper end of the chain Y is attached to a ring, Z, secured to the lower side of the tongue C by an eye-strap, eyebolt, or other suitable means. With this construction the draft is applied to the forward ends of the draft-rods X, and the whiffletrees and double-tree are kept by the chain Y from dropping down upon and breaking or injuring the plants when the draft is slackened.

When the plants get high the chain Y can be detached from the ring Z, doubled, and passed through the said ring and the double-tree attached to it, so that the said double-tree and whiffletrees will be raised above the plants.

To the rear end of the tongue C is attached a cross-rod, a, one end of which is bent into hook form, and its other end has an offset formed in it to bring it into line with the hook of the first end, as shown in Fig. 3, so that the two ends of the said cross-rods can be passed through the eyes of two eyebolts, b, attached to the cross-bar H, when it is desired to support the plows away from the ground for convenience in turning around and passing from place to place.

The cultivator-frame, both when in a working position and when suspended above the ground, can be rigidly connected with the carriage, if desired, by the hook-rods c, the forward ends of which are hooked into eyebolts or staples d, attached to the axle B, and their rear ends are hooked into eyebolts or staples e, attached to the upright bars G of the gage-frame.

The longitudinal bar I of the gage-frame is connected with the axle B and the tongue C by staples or links f or other hinged connection, to form a fulcrum-point, so that the machine can be readily guided and controlled by means of the handles J.

Having thus described my invention, I claim as new and desire to secure by Letters Patent—

1. The combination, with the carriage A B C D and the plow-beams L O P, of the inclined bars E, the uprights G, the cross-bars F H, and the longitudinal bar I, substantially as herein shown and described.

2. In a sulky-cultivator, the combination, with the inclined gage-bars E and the tongue C, of the draw-rods X and their supporting-chain Y, substantially as herein shown and described, whereby the draft is applied to the said inclined bars and the double-tree and whiffletrees are supported above the plants, as set forth.

3. In a sulky-cultivator, the combination, with the inclined bars E and the upright bars G, of the plow-beams L, substantially as herein shown and described.

4. In a sulky-cultivator, the combination, with the tongue C and the cross-bar H of the gage-frame, of the hook-rod a and the eyebolts or staples b, substantially as herein shown and described, whereby the plows can be suspended above the ground, as set forth.

5. In a sulky-cultivator, the combination, with the axle B and the uprights G of the gage-frame, of the hook-rods c and the eyebolts or staples d e, substantially as herein shown and described, whereby the gage-frame and the carriage can be rigidly connected, as set forth.

JOHN WESLEY ROCKAFELLOW.

Witnesses:
JESSE W. WELLER,
S. B. HILL.